United States Patent [19]
Martin

[11] Patent Number: 5,046,694
[45] Date of Patent: Sep. 10, 1991

[54] SEAT LEVELLING DEVICE

[76] Inventor: Gerry W. Martin, 59 Assiniboia Avenue, Yorkton, Saskatchewan, Canada, S3N 1N7

[21] Appl. No.: 548,259

[22] Filed: Jul. 5, 1990

[51] Int. Cl.⁵ ............................................. B60N 2/10
[52] U.S. Cl. ................................. 248/188.2; 297/314
[58] Field of Search ................... 248/188.2, 180, 371, 248/396, 398; 297/314, 326; 296/65.1

[56] References Cited

U.S. PATENT DOCUMENTS 1,390,506  9/1921  Carter ........................... 297/314 X
1,938,435 12/1933  MacAllister .................... 297/326 X
2,572,910 10/1951  Brown .................................. 248/371
3,572,816  3/1971  Brown ............................ 297/459 X Primary Examiner—Carl D. Friedman
Assistant Examiner—Derek J. Berger
Attorney, Agent, or Firm—Larson and Taylor

[57] ABSTRACT

A manually operable seat levelling device is described for an agricultural self-propelled machine, such as a grader or a mower. The mechanism, which is controlled by the user, serves to tip up one side of the driver's seat when required, for example when the machinery is working across a grade.

6 Claims, 1 Drawing Sheet

SEAT LEVELLING DEVICE

In the construction of self-propelled agricultural machinery, by which is meant implements ranging from a relatively small ride-on garden mower to a quite large earth moving grader or the like, it has long been realized that it is uncomfortable for the operator if the only seat provided is at an angle to the horizontal for any long period of time. Whilst this may not be of significant importance if the angle is in a fore-and-aft direction (e.g. a rising grade or a falling grade) it is known to be of importance in a side-to-side direction. Thus Carter, in U.S. Pat. No. 1,390,506 describes a seat, typically for a disc harrow, on which the seat is supported upon a curved bar placed across the width of the implement. The driver can move the seat from side to side, and thus is able to obtain a level upright position. A similar arrangement is described for a garden mower, in which an upwardly curved bench seat is used, by R. Brown in U.S. Pat. No. 3,572,816. In both of these examples, the machinery base is essentially parallel to the ground surface, and the need for a different seat angle arises because the ground is not level.

An alternative difficulty arises when although the ground surface is essentially level, the machinery is not, for example when two wheels on one side of a tractor are in a plowed furrow. At least two devices have been described which seek to overcome this problem, by T. Brown in U.S. Pat. Nos. 2,572,910 and 3,288,523 by Bollden. In each case a mechanism is interposed between the base of the seat and the body of, typically, a tractor such that as soon as an implement, such as a plow, is lowered into a ground-engaging position the angle of the driver's seat is also automatically changed, by raising one side of it. T. Brown describes a mechanical device, and Bollden describes a hydraulic system.

Notwithstanding these known approaches to this problem, none of them address the situation where the machinery is essentially parallel to the ground, that the ground may, or may not, be level, and that the driver needs to be able to stay essentially centrally placed in the vehicle in order to continue to be able adequately to control the vehicle. Thus this invention seeks to provide a driver-operated seat levelling device which overcomes these difficulties.

In its broadest embodiment this invention seeks to provide a seat levelling device for the driver's seat of an agricultural machine consisting essentially of:

(i) a seat support means attached to the machine;

(ii) a seat base means for the driver's seat;

(iii) a pivot means joining together a lateral side of each of the seat support and the seat base, and providing an axis of rotation therebetween parallel to the longitudinal axis of the machine;

(iv) a first shaft means rotatably attached to the seat support on a transverse axis of the machine and including a generally forwardly directed handle portion extending beyond the side of the support remote from the pivot;

(v) a second shaft means pivotally attached to the support means on a longitudinal axis parallel to the pivot axis including engagement means with the first shaft whereby rotation of the first shaft induces rotation in the second shaft;

(vi) at least one support arm attached to the second shaft carrying at its upper end a roller means; and (vii) at least one channel means attached laterally to the underside of the seat base adapted to engage the roller means;

whereby when the handle portion of the first shaft is rotated from a first position to a second position the seat base is caused to rotate through a limited arc about the pivot means.

Preferably, the device includes two support arms, each having a roller means engaging a channel, wherein one channel is substantially at the front of the seat, and the other channel is substantially at the rear.

The invention will now be described by way of the embodiment shown in the Figures in which.

Figure 1:
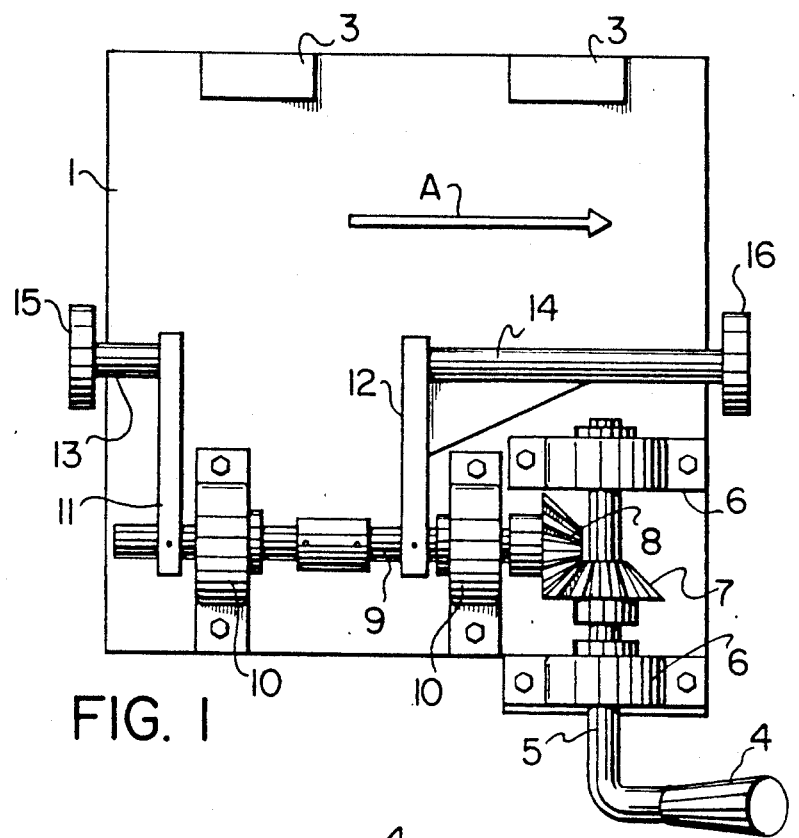
FIG. 1 shows a plan view of the mechanism.
Figure 2:
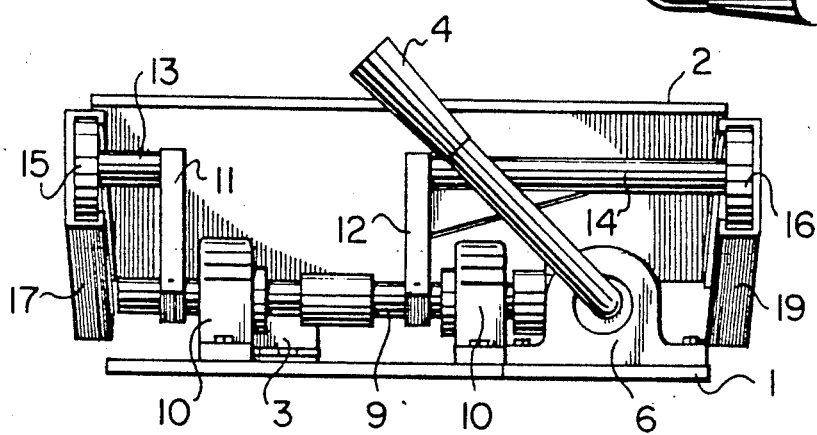
FIG. 2 shows a side view of the mechanism.

Referring first to FIGS. 1 and 2, the seat levelling device as shown includes a base plate, 1, which is attached to or forms part of, the structure of the agricultural machine. A second plate, 2, providing the seat base is attached to the base plate 1 by the hinges 3. The seat base, 2, will include suitable means to attach a conventional seat (as at 22 in FIG. 3). A handle 4, forming part of a first shaft 5 is rotatably mounted in the bearings 6. In FIG. 1 the handle is in the "down" position, and in FIG. 2 in the "up" position. The first shaft carries a bevel gear 7 which meshes with a second bevel gear 8 carried by the second shaft 9, which is rotatably supported by the bearings 10. The ratio between the gears 7 and 8 is chosen to provide a reasonable arc of movement for the handle 4. Attached to the second shaft 9 are two support arms 11 and 12, which in turn carry support arm shafts 13, 14 to which are attached the roller bearings 15 and 16. Bearing 15 engages with the channel 17, and bearing 16 with the channel 19. It can thus be seen that movement of the handle 4 will induce rotation of the shaft 9 and movement of the arms 11 and 12, thus resulting in the raising (or lowering) of one side of the seat about the hinges 3. As shown in FIG. 1, the arrow A points forward, and thus the right side of the seat is raised. To raise the left side, the mechanism is turned around, and the gear 7 reversed to engage the other side of the gear 8, as it is more convenient to raise the seat edge by moving handle 4 rearwardly.

Certain changes can be made in this device. First, if the base 2 is sufficiently stiff, only one support arm and channel would suffice, preferably placed more or less centrally. If desired, the roller bearings 15, 16 can be replaced with wheels journalled on the shafts 13, 14.

Figure 3:
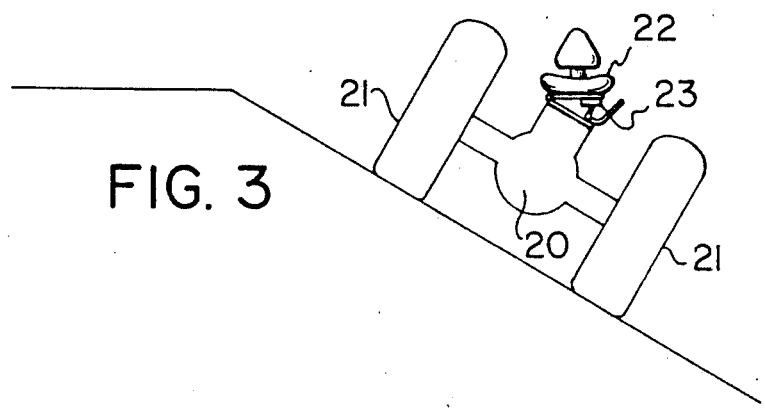
FIG. 3 shows schematically a tractor including the mechanism of FIGS. 1 and 2.

In FIG. 3 the device is shown included in the tractor shown schematically at 20, the wheels of which, 21, are shown engaged with a non-horizontal surface. Typically the slope of this surface, for example on embankments, is of the order of 1 in 4, that is at an angle of from about 10 degrees to about 20 degrees from the horizontal. Typically the angle is about 14°. The seat levelling device, shown schematically at 23 in the raised position, thus levels the seat 22 for the driver. The amount by which the seat is raised is controlled by the length of the arms 11 and 12, since the channels 17 and 19 include roller stops (not shown) at their ends against which the rollers 15, 16 abut when the lever 4 is in the "up" position.

The embodiments of the invention in which an exclusive property or privilege is claimed are defined as follows:

1. A seat levelling device for the driver's seat of an agricultural machine consisting essentially of:
   (i) a seat support means attached to the machine;
   (ii) a seat base means for the driver's seat;
   (iii) at least one hinge means joining together a lateral side of each of the seat support and the seat base, and providing an axis of rotation therebetween parallel to the longitudinal axis of the machine;
   (iv) a first shaft means rotatably attached to the seat support on a transverse axis of the machine and including a handle portion extending beyond the side of the support remote from the pivot;
   (v) a second shaft means pivotally attached to the support means on a longitudinal axis parallel to the pivot axis including a pair of level gears with the first shaft whereby rotation of the first shaft induces rotation in the second shaft;
   (vi) at least one support arm attached to the second shaft carrying at its upper end a roller means; and
   (vii) at least one channel means attached laterally to the underside of the seat base adapted to engage the roller means;

whereby when the handle portion of the first shaft is rotated from a first position to a second position the seat base is caused to rotate through a limited arc about the pivot means, said limited arc corresponding to an angle between the seat base and the seat support of from about 10 degrees to about 20 degrees.

2. A device according to claim 1 wherein the angle is about 14 degrees.

3. A device according to claim 1 including two support arms each including a roller means, and two channel means each engaged with one of the roller means.

4. A device according to claim 3 wherein a first channel means is attached laterally adjacent a front edge of the seat base, and a second channel means is attached laterally adjacent a rear edge of the seat base.

5. A device according to claim 1 wherein the roller means comprises a roller bearing.

6. A device according to claim 1 wherein the roller means comprises a wheel pivotally mounted on the support arm.

* * * * *